Patented July 22, 1952

2,604,405

UNITED STATES PATENT OFFICE 2,604,405

PROCESS FOR MAKING NONMILK FAT STABLE CHEESE

Harold J. Petersen, Tonica, Ill.

No Drawing. Application January 6, 1950, Serial No. 137,281

4 Claims. (Cl. 99—116)

This invention relates to a process for making non-milk fat stable cheese.

An object of the present invention is to provide a process for making a non-milk fat stable cheese which simulates in taste and texture that of butterfat-containing cheese.

Another object of the present invention is to provide a process for making a non-milk fat stable cheese from skimmed milk or the milk resulting from the separation of the cream from raw milk.

A further object of the present invention is to provide a process for making a non-milk fat stable cheese from skimmed milk and having an increased vitamin content.

A still further object of the present invention is to provide a process for making a non-milk fat stable cheese which is highly efficient and commercially practical.

Briefly stated, the process of the present invention comprises subjecting a batch of aged and stable non-milk fat cheese to a temperature of from 150° to 180° Fahrenheit for a time sufficient to convert same into a molten state, incorporating in said batch while being maintained in the molten state an edible oil in the presence or absence of a coagulant in quantity sufficient to produce a non-milk fat stable cheese product having the desired taste, and recovering the resultant batch in molded forms. Preferably, nutritive vitamins such as vitamin A and D are incorporated in the molten mass prior to its recovery into preformed non-milk fat cheese articles.

The aged and stable non-milk fat cheese employed as the starting material in the process of the present invention is obtained by first heating about a quart of skimmed milk derived from the separation of cream from raw milk to a temperature not exceeding 180° Fahrenheit for a short interval of time, for example 10 to 15 minutes, whereupon it is allowed to cool to room temperature and let stand quiescent at such temperature for about 24 hours. During this period of standing the skimmed milk coagulates or becomes sour.

Next, a quantity of skimmed milk obtained from freshly cream separated raw mlik, about 60 gallons, is subjected to a temperature of between 170° and 180° Fahrenheit and maintained at such temperature for a short period of time, about 15 to 20 minutes. At the conclusion of such period of time it is cooled gradually to room temperature, between 60° to 70° Fahrenheit. To this cooled liquid is then added the quart of soured skimmed milk, previously described, gradually and with thorough agitation. After thorough admixture of this soured skimmed milk, the liquid mass is allowed to stand quiescent for about 10 hours. During this period of quiescent standing this liquid mass also coagulates or becomes sour.

After the batch of soured skimmed milk has been prepared, about 2400 gallons of skimmed milk just obtained from freshly cream separated raw milk is heated to a temperature of between 160° to 170° Fahrenheit, preferably at about 165° Fahrenheit, and maintained at such temperature for a very short interval of time, about 15 to 20 seconds, whereupon it is then cooled rapidly to about 85° Fahrenheit. At the conclusion of the cooling the liquid is checked for acidity and its acidity noted. To this cooled mass is then incorporated the soured skimmed milk, obtained in the manner described in the next preceding paragraph, this incorporation being effected gradually and with thorough and constant agitation. At the conclusion of the admixture of the sour skimmed milk with the cooled skimmed milk, the batch is tested for acidity and its acidity noted. The batch is then permitted to remain quiescent for a short interval of time, about 10 to 15 minutes, at the conclusion of which time it is again tested for acidity. If the latter test shows an increase of acidity over the second test reading, the batch is then treated with a coagulant to effect separation into curd and whey to be subsequently described. Should the latter test show no increase of acidity over the second test reading, the batch must be allowed to stand quiescent a short time longer or until a subsequent test reading shows an increase over the second test reading.

When the batch shows an increase in acidity over the second test reading, it is then treated with a coagulant to effect separating into curd and whey. This is done by adding a coagulant like rennet to the batch while the latter is being maintained at 85° Fahrenheit. The rennet is added in the ratio of 3 ounces of rennet to each 120 gallons of the batch, the addition being gradual and with violent agitation. After the rennet has been thoroughly incorporated, the batch is permitted to stand quiescent for a short interval of time, say 15 to 20 minutes. During this period of time, sample tests are successively taken to determine the progress of the batch to the point of separation of the curd from the whey. When a sample test shows that there is a clear separation of the curd from the whey, the separated curd which floats about the surface of the whey is cut into quarter inch cubes by the conventional wire cutting method. After cutting, the whey is stirred gently, and while being so stirred is heated slowly to a temperature of about 100° to 105° Fahrenheit, preferably about 102° Fahrenheit, this heating to the latter named temperature being effected in about one hour. At this time, a sample test of whey is made to determine its acidity. Should this sample test show an acidity approximately the same as that of the batch before being subjected to the treatment with the coagulant, rennet, the whey is drawn off from the curd cubes. However, before the whey is tested and separated or drawn off, several of the curd cubes are extracted from the whey, pressed together, and the squeezed mass tested for acidity by the conventional dry method. When a sample test of the pressed curd cubes shows an acidity corresponding to that of the whey, the whey is then drawn off or separated from the mass of curd cubes. After the whey has been withdrawn the curd cubes settle into a homogeneous mass which is then cut into blocks. The blocks are then extracted and stacked upon each other in various piles. This stacking is continued until the resultant cheese slabs show by sample test that the acidity of the draining whey is slightly higher than that for normal non-fat cheese. The cheese slabs are then cut into cubes, the cubes placed in metal containers, and the metal containers pressed together. The pressed cheese cubes are left in the pressed containers for about 14 hours, then removed from the containers, and stored or aged in a refrigerator for at least six weeks or longer. The resultant cubes are each an aged and stable non-milk fat cheese.

The starting material or aged and stable non-milk fat cheese is placed in a kettle. Preferably, a quantity of the refrigerated cheese cubes after aging are each shredded and the shreddings introduced into the kettle. The kettle is then heated to a temperature of from 150° to 180° Fahrenheit, and this heating continued until the batch has been converted into a molten state. Preferably, the batch is subjected to thorough agitation during this heating. After the batch has been converted to a molten state an edible oil, such as peanut oil, cottonseed oil, coconut oil, or lard is added thereto, the batch being maintained in its molten state during such addition. The edible oil is added in an amount such that the final non-milk fat cheese product will show about 24% of edible oil. The heated batch is then poured into molds and allowed to cool. To the heated batch is preferably added an emulsifying agent like sodium citrate, tri-sodium phosphate, to effect a complete emulsification of the edible oil with the molten cheese. This emulsifying agent is added in an amount such that the final cheese product will show about 2% to 3% of such agent. The resultant product is a non-milk fat stable cheese which simulates in taste and texture butterfat-containing cheese.

To increase the nutritive value of the non-milk fat stable cheese resulting from the process of this invention vitamins A and D may be incorporated in the batch of aged and non-milk fat cheese while in the molten state. If incorporated, the vitamins A and D are preferably mixed with an emulsifying agent like sodium citrate in an amount sufficient to effect emulsification.

If desired, whey in either semi-solid or solid form may be incorporated in the batch of aged and non-milk fat cheese while in the molten state. The whey should be added in an amount such that the final non-milk fat stable cheese will show about 5%.

What is claimed is:

1. The process for making a non-milk fat stable cheese comprising producing a non-milk fat curd from skimmed milk, stacking the curd to develop the desired acidity, cutting the curd, placing the cut curd in containers, pressing the containers together for about fourteen hours to produce aged and stable non-milk fat cheeses, aging the pressed cheeses under low temperature conditions for at least six weeks, shredding the aged cheeses, heating the shredded cheese to a temperature of about 150° to 180° Fahrenheit to melt the same, agitating the melted cheese and adding an edible oil selected from the group consisting of peanut oil, cottonseed oil, coconut oil, lard, and recovering the resultant product in molded forms of non-milk fat stable cheese.

2. A process according to claim 1 wherein an emulsifying agent selected from the group consisting of sodium citrate, trisodium phosphate is added to the melted cheese during the agitating step.

3. A process for making a non-milk fat stable cheese comprising subjecting a batch of skimmed milk to a temperature between 160° to 170° Fahrenheit for a short interval of time, cooling said batch to a temperature between 80° to 90° Fahrenheit, incorporating in said batch while maintaining it at a temperature between 80° to 90° Fahrenheit a soured skimmed milk, adding rennet to the thus formed liquid in quantity sufficient to coagulate the curd, separating the whey from the curd, recovering the curd, stacking the curd to develop the desired acidity, cutting the curd, placing the cut curd in containers, pressing the containers together for about fourteen hours to produce aged stable non-milk fat cheeses; aging the pressed cheeses under low temperature conditions for at least six weeks, shredding the aged cheeses. heating the shredded cheese to a temperature of about 150° to 180° Fahrenheit to melt the same, agitating the melted cheese and adding an edible oil selected from the group consisting of peanut oil, cottonseed oil, coconut oil, lard; and recovering the resultant product in molded forms of non-milk fat stable cheese.

4. A process according to claim 3 wherein an emulsifying agent selected from the group consisting of sodium citrate, trisodium phosphate, is added to the melted cheese during the agitation step.

HAROLD J. PETERSEN.

REFERENCES CITED

The following references are of record in the file of this patent:

UNITED STATES PATENTS

| Number | Name | Date |
| --- | --- | --- |
| 1,578,820 | Gere | Mar. 30, 1926 |
| 1,590,837 | Liebers | June 29, 1926 |
| 1,676,138 | Epstein | July 3, 1928 |
| 1,847,210 | Caccia | Mar. 1, 1932 |
| 2,326,133 | Fear | Aug. 10, 1943 |